Sept. 13, 1960

J. J. CHYLE ET AL 2,952,231

WELD BACK-UP CONSTRUCTION

Filed March 9, 1953

INVENTOR.
JOHN J. CHYLE
MICHAEL W. ZIMMERMANN

BY Andrus & Scales

ATTORNEYS.

United States Patent Office 2,952,231
Patented Sept. 13, 1960

2,952,231

WELD BACK-UP CONSTRUCTION

John J. Chyle and Michael W. Zimmermann, Milwaukee, Wis., assignors to A. O. Smith Corporation, Milwaukee, Wis., a corporation of New York Filed Mar. 9, 1953, Ser. No. 341,284

7 Claims. (Cl. 113—103)

This invention relates to welding and more particularly apparatus for supporting and forming molten weld metal during welding of a joint between two metal articles.

An object of the present invention is to provide a backing material to be applied to the underside of a joint between two metal articles which will cushion the molten weld metal during welding of the joint and produce a smooth convex underbead.

Another object of the invention is to provide a glass backing strip which may be employed with hand arc welding and which will not fuse through to the supporting surface during momentary hesitations occurring during the hand welding.

Still another object is to provide a welding back-up material which does not require the use of a supporting metal chill to conduct the heat from the welding area.

Another object is to provide backing material in the form of a flexible strip which may be readily applied to the underside of the joint between the metal articles to be welded.

The present invention is directed to a backing strip comprising a sheet of glass having the supporting surface covered by a layer of fibrous glass material in the form of matting or the like. The glass sheet and matting are enclosed within a glass fabric sock or casing which serves to house the materials and prevent relative movement or displacement thereof.

The backing strip is adapted to be applied to the underside of a joint between adjacent ends of two metal articles to be welded and serves to support and form the molten weld metal during welding. When applied to tubular articles such as pipe sections, the glass sheet is broken at intervals throughout its length to permit the strip to conform to the contour of the articles.

The backing strip of the present invention has a compressible supporting surface due to the layer of fibrous matting and this permits the molten weld metal to sink within the strip and form a convex weldbead. In addition, the sheet of glass beneath the matting serves to effectively insulate the welding area and thereby eliminates the necessity of using a metallic chill to dissipate the heat of welding.

Figure 1:
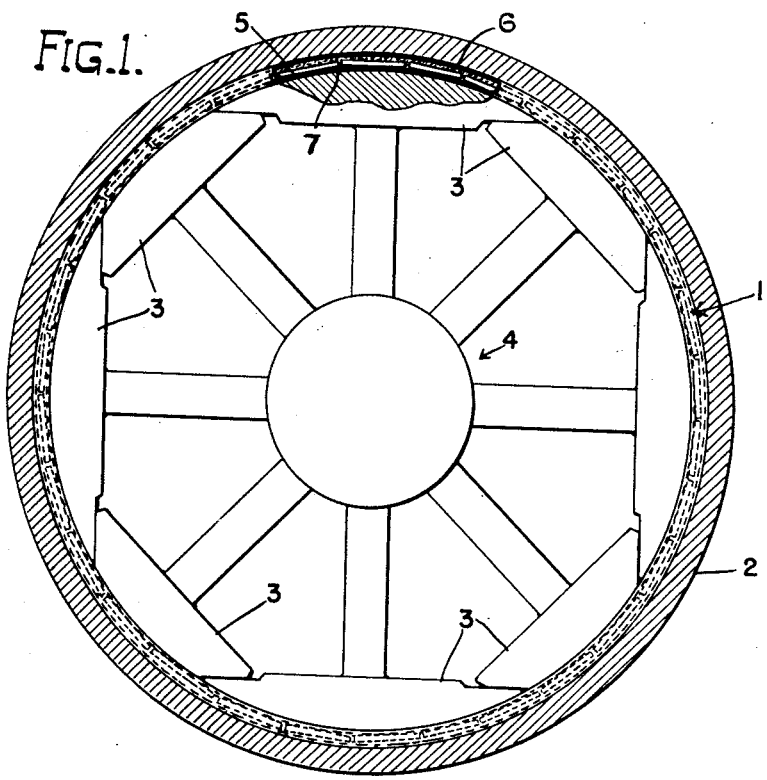
Figure 1 is a vertical transverse section taken through one of a pair of pipe sections disposed in an end-to-end relation and showing the application of the backing strip with parts broken away and sectioned.

Referring to the drawings there is shown a backing strip 1 to be applied to the underside of a joint between the adjacent ends of two metal articles 2 to be welded together. The backing strip serves to support the molten weld metal and form the underbead.

When the backing strip 1 is to be employed with tubular members, as shown in the drawing, the strip is formed in a generally circular shape with the ends joined together to form a ring. The backing strip 1 is carried by a plurality of circumferentially spaced supporting shoes 3 which are adapted to be expanded outwardly to bring the strip 1 into contact with the pipe sections 2. The shoes 3 are adapted to be moved outwardly and inwardly in accordance with the operation of an expandable fixture 4 shown schematically. The adjacent ends of the shoes are beveled to permit the shoes to move radially and provide a substantially continuous circular supporting surface when the shoes are in the outward expanded position.

The backing strip 1 comprises a thin sheet of glass 5 covered on the outer or supporting face with a layer of cushioning material 6. Both the sheet 5 and layer 6 are enclosed in a fabric casing 7.

The glass sheet 5 may be formed of any of the common types of glass which will not give off gases on heating or fusing and which does not contain elements or ingredients that are apt to react or alloy with the molten weld metal to produce undesirable properties in the weld. Most of the ordinary types of flat glass, optical glass, window glass, etc. are acceptable for use as the sheet 5.

The thickness of the glass sheet is preferably in the range of about $1/16$ to $1/8$ of an inch with a thickness of $3/32$ of an inch being very satisfactory for most operations. However, the thickness of the sheet 5 may vary depending on the particular type of welding employed, the metals to be welded, and the thickness and type of materials employed for the layer 6 and casing 7.

When the backing strip is employed with tubular members, as shown in the drawing, the glass sheet 5 may be broken at various intervals throughout its length to provide a series of small glass sheets disposed in a generally end-to-end relation and thereby enable the strip to conform to the general curvature of the tubular members.

The sheet 5, whether as a single continuous strip or a series of small plates, serves primarily as an insulating medium and reduces the transfer of heat from the welding area to the supporting surface, such as indicated by shoes 3, so that the temperature of shoes 3 will be maintained substantially below the melting point thereof. Without the insulating effect of the glass plate 5, the shoes 3 or other supporting member might be heated to a temperature above the melting or fusing temperature thereof. In such circumstances a heat distributing member such as a copper chill is ordinarily disposed against the supporting surface of the shoes and functions to distribute the intense localized heat over a larger area and thus reduce the temperatures at the welding area. However, with the use of the glass sheet 5, the shoes 3 are maintained relatively cool and thus the use of a chill may be eliminated with the present backing strip.

Since shoes 3 or other supporting surface are maintained at a relatively low temperature during welding by the insulating effect of sheet 5, the shoes may thus be constructed of any low heat conductivity materials without danger of the shoes being charred or otherwise deformed by excessive heat.

The layer 6 is preferably composed of an inert, insulating fibrous material. As the material of layer 6 is contacted by the molten weld metal, the material should not react or decompose to give off gases or give up water of hydration as vapor when heated to elevated temperatures during the welding operation. In addition, the material of layer 6 should not contain components which will alloy with the weld metal to produce undesirable properties in the weld.

Fibrous glass materials in the form of matting, wool, braided tubing, woven fabric or the like are particularly satisfactory for use as the layer 6.

The cushioning layer 6 being of a compressible and fusible nature permits the molten weld metal to sink therein beneath the lower surface of the articles to be welded and thus enables a convex weld bead to be formed on the underside of the weld seam.

The fibrous glass material fuses at the temperatures of welding causing a reduction in volume of the material, thereby permitting the weld metal to sink beneath the surface of the article and form a convex weld bead. In addition the fused glass provides the weld bead with an extremely smooth surface.

The thickness of the cushioning layer 6 depends on the type of material used, the degree of convexity desired in the weld bead, and the pressure exerted on the strip in supporting the same. For many operations it has been found that a layer 6 composed of fibrous glass matting and having a thickness, as applied to the articles in a semi-compressed state, of about $1/16$ of an inch is satisfactory.

It may be desirable to completely surround the glass sheet 5 with the material 6 to further increase the insulating value of the backing strip and to prevent the sharp edges of sheet 5, particularly when in the form of a series of small sections, from slashing casing 7.

Casing 7 is preferably composed of a fibrous material similar to that of the material of layer 6. As in the case of layer 6 and sheet 5, casing 7 should be composed of an inert material which will not evolve gases nor alloy with the weld metal. Woven glass in the form of fabric or netting may be used for casing 7.

Figure 2:
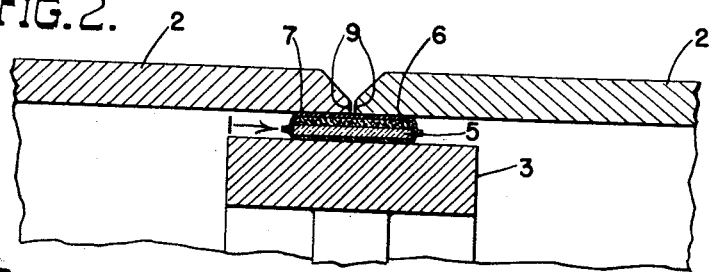
Fig. 2 is an enlarged fragmentary longitudinal section of the joint and the backing strip before welding.
Figure 3:
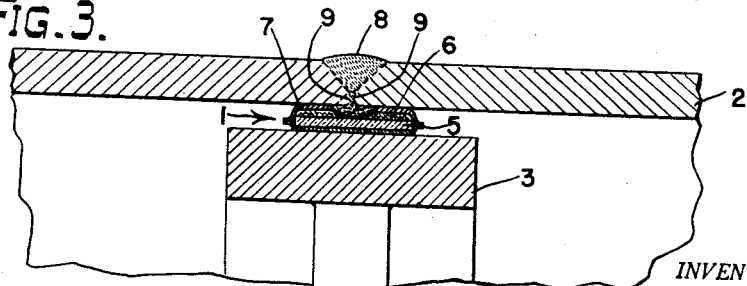
Fig. 3 is a view similar to Fig. 2 after the welding operation.

Casing 7 is of a hollow construction and may be fabricated in any desired manner with the casing shown in Fig. 2 consisting of an upper and lower half which are joined together at the side edges by sewing, stapling or the like to provide an enclosure within which the sheet 5 and layer 6 are housed.

Casing 7 serves to house the sheet 5 and layer 6 and prevent relative movement therebetween. In addition, when the sheet 5 is in a series of small sections, the casing functions to maintain alignment of the sections.

During welding the molten weld metal 8 flows between the lips 9 of the adjacent articles 2 and contacts the layer 6. The heat of the molten weld metal 8 will fuse the underlying casing 7 and layer 6 causing a marked reduction in volume of the fused portion and enabling the weld metal to sink beneath the lower surface of the articles 2. The amount that the weld metal sinks within the layer 6 generally determines the convexity of the weld bead and depends upon the apparent density of the layer 6.

Under normal operation, the heat transmitted through layer 6 may tend to fuse the upper surface of sheet 5, but sheet 5 will ordinarily not be fused through to the lower face thereof even with the hesitations accompanying hand welding. Sheet 5 serves to more rigidly support the molten weld metal after the same has sunk through the layer 6 and thus prevents excessive convexity of the weld bead.

The present invention provides an inexpensive backing strip which may be readily applied to the underside of a joint between adjacent ends of two flat or tubular metal articles. The strip may be used with automatic or hand welding and serves to support the molten weld metal and form a smooth convex underbead.

The backing strip may be employed with equal success if the lips 9 are of appreciable thickness, as shown in the drawing, or if they have a feather edge. In addition, the lips 9 may either be in tight engagement or separated with a substantial gap therebetween and yet the underbead in either case will be formed with the desired convexity and smoothness.

Because of the insulating value of the strip, the use of a metal chill to conduct heat from the welding area is not required.

Various embodiments of the inventions may be employed within the scope of the following claims.

We claim:

1. A welding back-up strip adapted to be applied to the underside of a joint between the adjacent edges of two metal articles to be welded together and serving to support and form the molten weld metal, which comprises a thin monolithic sheet of glass, a layer of fibrous glass disposed on the supporting surface of said sheet, and a fibrous glass casing enclosing said sheet and layer and preventing relative movement of the layer in relation to said sheet.

2. A welding back-up strip adapted to be applied to the underside of a joint between the adjacent edges of two metal articles to be welded together and serving to support and form the molten weld metal, which comprises a solid thin glass sheet having a thickness of about $3/32$ of an inch, a layer of fibrous glass disposed on the supporting surface of said glass sheet, and a glass fabric casing disposed tightly around said glass sheet and said layer to maintain the relative position of said layer with respect to said sheet.

3. A welding back-up strip adapted to be applied to the underside of a joint between the adjacent ends of two tubular metal articles to be welded together, which comprises a series of solid thin glass plates disposed in a generally end-to-end relation to form a ring with each of said plates being of a length to permit the ring to conform to the general curvature of the tubular members, and a tubular casing composed of glass fibers enclosing said ring and maintaining alignment of said plates.

4. A welding back-up strip adapted to be applied to the underside of a joint between adjacent ends of two tubular members to be welded together, which comprises a series of thin monolithic glass plates disposed in an end-to-end relation to form a ring with each plate being of a length to permit said ring to conform to the curvature of said tubular members, and a layer of glass fibers disposed on the outer surface of said ring for cushioning the molten weld metal during welding and forming a smooth convex weld bead.

5. A welding back-up strip adapted to be applied to the underside of a joint between adjacent ends of two tubular members to be welded together, which comprises a series of solid thin glass plates disposed in an end-to-end relation to form a ring with each plate being of a length to permit said ring to conform to the curvature of said tubular members, a continuous layer of fibrous glass material disposed on the outer surface of said ring, and a glass fabric casing to house said ring and said layer and maintain alignment of said plates.

6. A welding back-up apparatus adapted to be applied to the underside of a joint between the adjacent edges of two metal articles to be welded together, which comprises a supporting member formed of a relatively low heat conductivity material, and a backing strip disposed on the supporting surface of said member, said backing strip comprising a solid thin glass plate and a layer of fibrous glass material disposed on the outer surface of said plate, said layer serving to cushion the molten weld metal and form a smooth convex weld bead, and said glass plate serving to insulate the welding area and maintain the undersurface of the backing strip at a relatively low temperature to eliminate the use of a metallic chill to back said strip.

7. A welding back-up apparatus adapted to be applied to the underside of a joint between adjacent ends of two tubular members to be welded together, which comprises a relatively low heat conductively expandable supporting member, and a backing strip disposed on the supporting surface of said supporting member and adapted to be brought into contact with said tubular members by expansion of said supporting members, said strip comprising a series of thin monolithic glass plates disposed in an end-to-end relation to form a ring with each plate having a thickness of about 3/32 of an inch and being of a length to permit said ring to conform to the curvature of said tubular members and having a continuous layer of fibrous glass material disposed on the outer surface of said ring and aligned with said joint and having a glass fabric casing housing said ring and said layer and maintaining alignment of said plates.

References Cited in the file of this patent

UNITED STATES PATENTS

| | | |
|---|---|---|
| 1,563,584 | O'Shaughnessy | Dec. 1, 1925 |
| 1,748,587 | Smedley | Feb. 25, 1930 |
| 2,311,613 | Slayter | Feb. 16, 1943 |
| 2,331,689 | Hodge | Oct. 12, 1943 |
| 2,331,937 | Schreiner | Oct. 19, 1943 |
| 2,362,505 | Smith | Nov. 14, 1944 |
| 2,792,626 | Chyle | May 21, 1957 |
| 2,820,427 | Chyle et al. | Jan. 21, 1958 |